United States Patent
DesJardins et al.

[11] Patent Number: 5,561,723
[45] Date of Patent: Oct. 1, 1996

[54] LOCALIZED IMAGE COMPRESSION CALCULATION METHOD AND APPARATUS TO CONTROL ANTI-ALIASING FILTERING IN 3-D MANIPULATION OF 2-D VIDEO IMAGES

[75] Inventors: Philip A. DesJardins, Nevada City; James V. Squier, Penn Valley, both of Calif.

[73] Assignee: Tektronix, Inc., Wilsonville, Oreg.

[21] Appl. No.: 848,610

[22] Filed: Mar. 9, 1992

[51] Int. Cl.$^6$ .............................. G06K 9/40; H04N 9/74
[52] U.S. Cl. .................... 382/260; 382/232; 382/285; 382/293; 348/578; 348/580
[58] Field of Search .............................. 382/54, 45, 46, 382/47, 56, 232, 260, 264, 265, 293; 358/22; 340/747; 395/125, 127, 119, 126; 348/578, 580

[56] References Cited

U.S. PATENT DOCUMENTS

| | | | |
|---|---|---|---|
| 4,717,951 | 1/1988 | Fling | 358/167 |
| 5,077,608 | 12/1991 | Dubner | 395/125 |
| 5,193,126 | 3/1993 | Matsuki | 382/46 |

OTHER PUBLICATIONS

"Analysis of Transforms for the Control of Anti-aliasing Filters", David Lake, Jun. 5, 1984.
"Skew Analysis in the Control of Anti-aliasing Filters", David Lake, Jan. 5, 1988.

*Primary Examiner*—Jose L. Couso
*Assistant Examiner*—Matthew C. Bella
*Attorney, Agent, or Firm*—John Smith-Hill; Francis I. Gray

[57] ABSTRACT

A dynamically variable anti-aliasing filtering system calculates on a local basis the compression factors (Cf) present in an image that is being mapped from a two-dimensional source image through a three-dimensional space and into a two-dimensional target image, the apparatus implementing a linear equation of the form:

$$Cf = A * X_s + B * Y_s + C$$

where, $X_s$ and $Y_s$ are, respectively, the horizontal and vertical coordinates of pixels in the source image, and A, B and C are precalculated (each field or frame) constants that depend on the transform matrix function F. A total of four compression factors are required, one for control of horizontal luminance filtering, one for control of vertical luminance filtering, one for control of horizontal chrominance filtering and one for control of vertical chrominance filtering. Three dual accumulator circuits are used to implement the linear equation in $X_s$ and $Y_s$ for three different sets of A, B and C. One of these circuits measures horizontal chrominance compression, one vertical luminance compression and one compression due to skew angles. The outputs of these circuits are converted to logarithms and combined with each other and with the logarithms of multiplicative constants representing the ratios between calculated compression factors and the other required compression factor to produce those other compression factors.

39 Claims, 5 Drawing Sheets

LOCALIZED IMAGE COMPRESSION CALCULATION METHOD AND APPARATUS TO CONTROL ANTI-ALIASING FILTERING IN 3-D MANIPULATION OF 2-D VIDEO IMAGES

BACKGROUND OF THE INVENTION

This invention relates to video special effects, and more particularly to an improved apparatus and method for the calculation of image compression to optimize the amount of anti-aliasing filtering that is performed over different parts of a video image that is to be mapped from 2-D to 3-D and back to 2-D.

A three-dimensional digital video effects system maps an incoming video image that is two-dimensional into a three-dimensional space and then performs a perspective projection of the mapped image back into two dimensions for eventual display. The incoming (source) image is in the form of a two-dimensional array of picture elements, or pixels. This array of pixels is resampled into an output (target) image, which is also a two-dimensional array of pixels.

Because the mapping (transformation) of the source image into three-dimensional space and back into the target image results in varying amounts of compression (resizing) of the source image as it appears in the target image, the resampling operation often results in an undersampling of the source image detail as it appears in the target image. Image undersampling can produce the effect commonly known as "aliasing". Aliasing can arise whenever the two-dimensional frequency content of the source image is greater than half of the two-dimensional sampling rate of that image by the resampling process in forming the target image. The visual effect that results from aliasing is a displeasing graininess in the resulting target image.

Aliasing can be reduced by low-pass filtering the source image prior to resampling, so as to reduce its high frequency content at and above the resampling rate. Excessively low-pass filtering the incoming video image, with a cutoff frequency that is much below the resampling frequency, causes a blurring of the resulting target image. It is therefore important to know exactly how much compression of the image has taken place, so that the anti-aliasing low-pass filtering can be minimized and yet be effective. A useful rule is that the cutoff frequency of the anti-aliasing filter, normalized to the sample rate of the incoming image, be 1/(2.0×the amount of compression).

Sending an image to a farther perceived depth via an effects transform image makes the target image appear smaller than the source image. An effects system can also make the target image look smaller by resizing the source image through remapping. Without any additional depth cues it is impossible to tell if a compressed target image is a result of resizing or of depth displacement. For the remainder of this document we will refer to compression from resizing and compression from depth displacement as depth-based compression.

The amount of compression of the source image as it appears in the target image arises from both the perception of depth and of perspective skew, each of which arises from the apparent perspective in which the source image appears in the target image. Referring to FIG. 1A, it can be seen that the "A" on the left appears smaller and therefore compressed relative to the one on the right. And, referring to FIG. 1B, it can be seen that the "B" at the top left and the "B" at the top right have undergone some perspective or vanishing point compression relative to the "B" at the top middle. All three "B"s in the top of this image have undergone the type of compression seen in FIG. 1A, but the ones on the sides are also affected by additional compression due to vanishing point (perspective) skew that makes the rectangular source image appear as a trapezoid.

Because both of these factors, perception of depth and perspective skew, vary from point to point within a transformed image, determining the cut-off frequency for the low-pass filtering process is preferably accomplished locally within the image, ideally on a pixel-by-pixel basis, so that only the minimum necessary amount of filtering is performed. Thus, the compression factors should be calculated in video real time, and it is naturally desirable to be able to calculate these compression factors with a minimum of computational resources.

Performing the function of finding local compression factors to aid in optimizing anti-aliasing filtering is not new. For example, the DPM-1 (also known as "Kaleidoscope") video effects system made by The Grass Valley Group, Inc. of Grass Valley, Calif., provides a system for finding local compression factors to aid in controlling anti-aliasing filtering; however, in that system a great deal of computational resources are employed to attain the desired filter compression factor control signals.

SUMMARY OF THE INVENTION

It is an object of the present invention to provide a simpler approach to the calculation of local image compression factors used to optimize the amount of anti-aliasing filtering of a planar video image that is being mapped from 2-D to 3-D and back to 2-D, the simpler approach conserving computational resources while producing the desired filtering.

Accordingly, there is provided a dynamically variable anti-aliasing filtering system that includes an apparatus for calculating locally the compression factors (Cf) present in an image that is being mapped from a two-dimensional source image through a three-dimensional space and into a two-dimensional target image according to a transform function F, the apparatus implementing a linear equation of the form:

$$Cf = A*X_s + B*Y_s + C$$

where, $X_s$ is the horizontal step (ideally one pixel) location in the source image, $Y_s$ is the vertical step (ideally one line) number in the source image, and A, B and C are precalculated (each field or frame) constants that depend on the transform function F. Simplifying assumptions and considerable pre-calculation allow this linear equation to produce acceptable compression factors for control of the anti-aliasing filtering.

The linear equation can be implemented using a dual accumulator, with the first stage of the dual accumulator being initialized with C at the beginning of each field or frame and accumulating by B each vertical step (yielding $C+B*Y_s$) and the second stage being initialized with the output of the first stage each vertical step at the beginning of each line and accumulating by A each horizontal step (yielding $A*X_s+B*Y_s+C$), so that Cf is always available at the output of the second stage of the dual accumulator.

A total of four compression factors are required, one for control of horizontal luminance filtering, one for control of vertical luminance filtering, one for control of horizontal chrominance filtering and one for control of vertical chrominance filtering. If a key signal (often used to specify the opacity of its related video signal for mixing with other signals) is being filtered, its filter control will be shared with the control for luminance because those two signals are usually sampled at the same rates. Chrominance is sampled horizontally at half the luminance rate, and therefore needs separate control.

Three of the dual accumulator circuits are used to implement the linear equation in X and Y for three different sets of A, B and C. One of these circuits measures horizontal chrominance compression, one vertical luminance compression and one the compression due to skew angles. The outputs of these circuits are converted to their logarithms and combined with each other to produce two of four required compression factors. The other two compression factors are obtained by adding the logarithms of multiplicative constants to the logarithms of those that have been calculated. These multiplicative constants are the ratios, which are constant within each field or frame, between the calculated compression factors and the other required compression factors.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

DETAILED DESCRIPTION

Figure 1A:
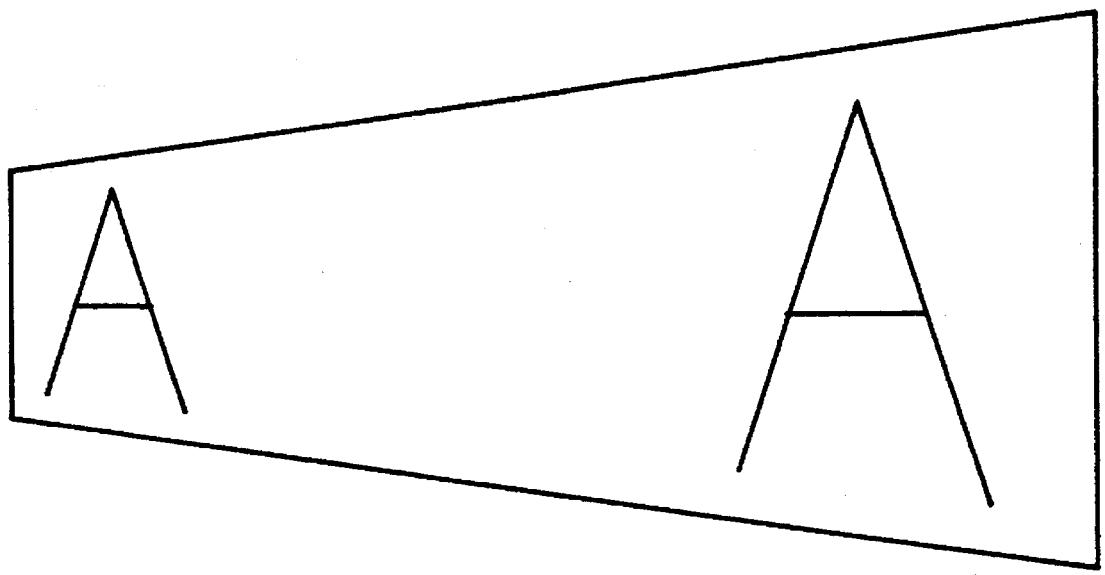
FIGS. 1A and 1B illustrate the compression and skew effects that create the need for anti-aliasing filtering with optimized filter selection based on local compression.
Figure 1B:
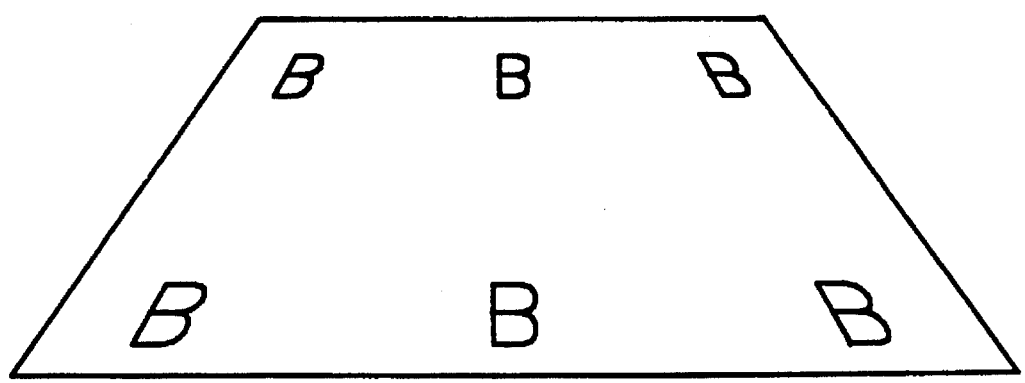
Figure 2:
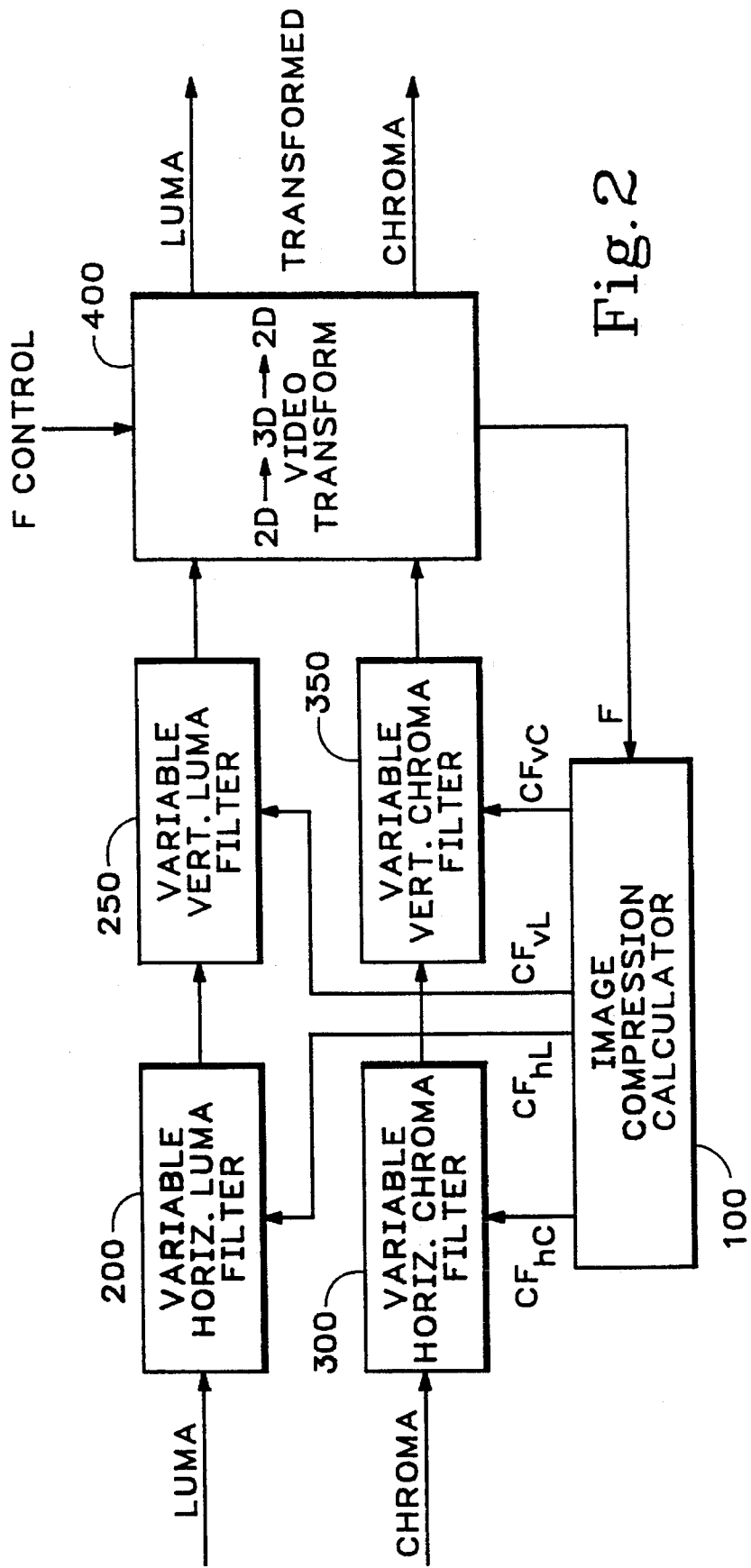
FIG. 2 is a block diagram of a portion of a video effects system that performs 3-D manipulation of 2-D images and anti-aliasing filtering.

Referring to FIG. 2, luminance and chrominance video components are applied to a two-dimensional to three-dimensional to two-dimensional video transform circuit 400 through a set of variable filters under the control of an image compression calculator 100. The set of variable filters 200, 250,300,350 comprises a variable horizontal luminance filter 200, a variable vertical luminance filter 250, a variable horizontal chrominance filter 300 and a variable vertical chrominance filter 350.

The 2D-3D-2D video transform circuitry 400 receives operator inputs, F control, that determine how the planar two-dimensional image is to be manipulated in the three-dimensional space. This input determines the transform matrix function, F, that the image compression calculator 100 receives from the 2D-3D-2D video transform circuit 400.

$$F = \begin{bmatrix} D & H & M \\ E & J & N \\ G & K & P \end{bmatrix} \quad (1)$$

The video transform circuitry 400 uses the transform matrix function F to map source space pixels $(X_s, Y_s)$ to intermediate three-dimensional variables $X_i$, $Y_i$ and $Z_i$ as follows:

$$\begin{bmatrix} X_i \\ Y_i \\ Z_i \end{bmatrix} = \begin{bmatrix} D & H & M \\ E & J & N \\ G & K & P \end{bmatrix} * \begin{bmatrix} X_s \\ Y_s \\ 1 \end{bmatrix} \quad (2)$$

The transformed target output image is derived from the intermediate three-dimensional variables using perspective projection onto an output plane in which $Z_t=0$ according to the following equations:

$$X_t = \frac{X_i}{Z_i} \quad (3)$$

$$Y_t = \frac{Y_i}{Z_i} \quad (4)$$

The image compression calculator 100 uses the information contained in the transform matrix function F to determine how much compression is going to occur in the immediate region of each pixel, and produces, on a pixel-by-pixel basis, a horizontal chrominance compression factor, $Cf_{hC}$, a horizontal luminance compression factor, $Cf_{hL}$, a vertical luminance compression factor, $Cf_{vL}$ and a vertical chrominance compression factor, $Cf_{vC}$, each for controlling the behavior of the respective filters.

Each variable filter 200, 250, 300 and 350 has 128 different settings that vary from no filtering, which is appropriate to a compression factor of 1:1 or even image expansion, to a maximum level of filtering which is appropriate to a compression factor of approximately 16:1.

Figure 3:
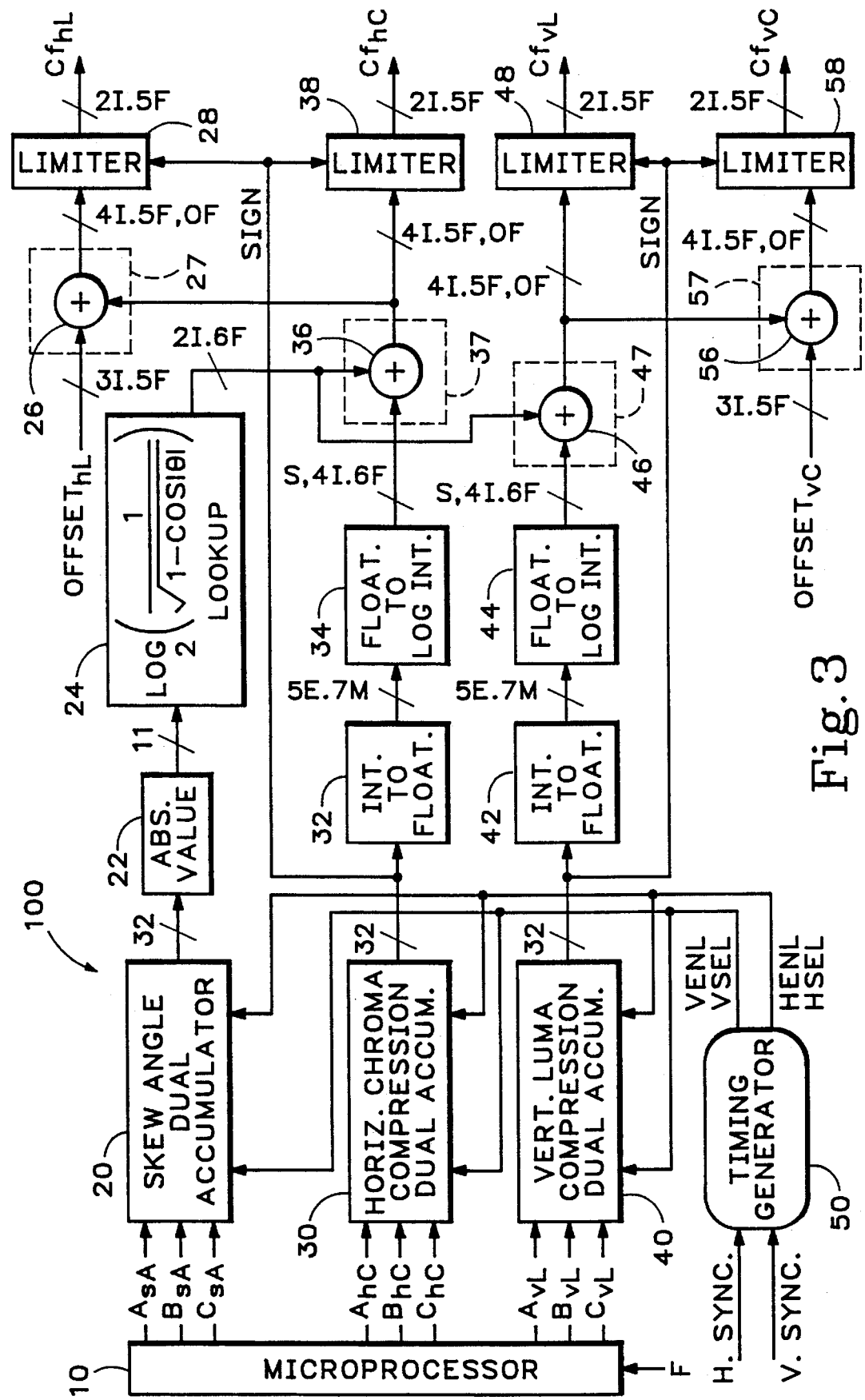
FIG. 3 is a block diagram of an image compression calculator according to the present invention.

FIG. 3 shows one embodiment of an image compression calculator according to the present invention. A microprocessor 10 receives the transform matrix function F from the video transform circuitry 400, and from it calculates skew angle coefficients $A_{sa}$, $B_{sa}$ and $C_{sa}$, horizontal chrominance compression coefficients $A_{hC}$, $B_{hC}$ and $C_{hC}$, and vertical luminance compression coefficients $A_{vL}$, $B_{vL}$ and $C_{vL}$. These coefficients are downloaded to their respective dual accumulators 20, 30 and 40 before the beginning of each field (or frame in a noninterlaced system). The calculation of these coefficients will now be discussed in detail.

COORDINATE DEFINITIONS:
Source Coordinates:

$L_h$=last pixel on 1st line
$L_v$=last line

Target coordinates X, as mapped from the indicated source coordinates (h,v):

$X_{(0,0)}$=x coord. from 1st pixel on 1st line
$X_{(1,0)}$=x coord. from 2nd pixel on 1st line
$X_{(Lh,0)}$=x coord. from last pixel on 1st line
$X_{(Lh+1,0)}$=x coord. from last pixel plus one*, 1st line
$X_{(0,1)}$=x coord. from 1st pixel on 2nd line
$X_{(Lh,1)}$=x coord. from last pixel on 2nd line
$X_{(0,Lv)}$=x coord. from 1st pixel on last line
$X_{(1,Lv)}$=x coord. from 2nd pixel on last line
$X_{(0,Lv+1)}$=x coord. from 1st pixel on last-plus-one* line $Y_{(0,0)}$=Y coord. from 1st pixel on 1st line
$Y_{(1,0)}$=Y coord. from 2nd pixel on 1st line
$Y_{(Lh,0)}$=Y coord. from last pixel on 1st line
$Y_{(Lh+1,0)}$=Y coord. from last pixel plus one*, 1st line
$Y_{(0,1)}$=Y coord. from 1st pixel on 2nd line $Y_{(Lh,1)}$=Y coord. from last pixel on 2nd line
$Y_{(0,Lv)}$=Y coord. from 1st pixel on last line
$Y_{(1,Lv)}$=Y coord. from 2nd pixel on last line
$Y_{(0,Lv+1)}$=Y coord. from 1st pixel on last-plus-one* line

* indicates values obtained by extrapolation.

CHANGE FACTORS AT CORNERS IN TARGET SPACE:

$dX_{h1}$=x distance moved in target space for a unit horizontal step in source space, for source's 1st pixel on 1st line
$dY_{h1}$=y distance moved in target space for a unit horizontal step in source space, for source's 1st pixel on 1st line
$dX_{h2}$=x distance moved in target space for a unit horizontal step in source space, for source's last pixel on 1st line
$dY_{h2}$=y distance moved in target space for a unit horizontal step in source space, for source's last pixel on 1st line
$dX_{h3}$=x distance moved in target space for a unit horizontal step in source space, for source's 1st pixel on last line
$dY_{h3}$=y distance moved in target space for a unit horizontal step in source space, for source's 1st pixel on last line $dX_{v1}$=x distance moved in target space for a unit vertical step in source space, for source's 1st pixel on 1st line
$dY_{v1}$=y distance moved in target space for a unit vertical step in source space, for source's 1st pixel on 1st line
$dX_{v2}$=x distance moved in target space for a unit vertical step in source space, for source's last pixel on 1st line
$dY_{v3}$=y distance moved in target space for a unit vertical step in source space, for source's last pixel on 1st line
$dX_{v3}$= x distance moved in target space for a unit vertical step in source space, for source's 1st pixel on last line
$dY_{v3}$=y distance moved in target space for a unit vertical step in source space, for source's 1st pixel on last line Each of these change factors at the corners can then be evaluated in terms of the matrix elements of the transform matrix function, F, as shown in equation (2) as follows:

$$dX_{h1} = X_{(1,0)} - X_{(0,0)} \quad (5)$$

$$= \frac{D+M}{G+P} - \frac{M}{P} \quad (5.1)$$

$$= \frac{P(D+M) - M(G+P)}{P(G+P)} \quad (5.2)$$

$$= \frac{DP - MG}{P(G+P)} \quad (5.3)$$

Similarly, but omitting the intermediate steps:

$$dY_{h1} = Y_{(1,0)} - Y_{(0,0)} \quad (6)$$

$$= \frac{EP - NG}{P(G+P)} \quad (6.1)$$

$$dX_{h2} = X_{(Lh+1,0)} - X_{(Lh,0)} \quad (7)$$

$$= \frac{DP - MG}{(G(Lh+1)+P)*(G*Lh+P)} \quad (7.1)$$

$$dY_{h2} = Y_{(Lh+1,0)} - Y_{(Lh,0)} \quad (8)$$

$$= \frac{EP - NG}{(G(Lh+1)+P)*(G*Lh+P)} \quad (8.1)$$

$$dX_{h3} = X_{(1,Lv)} - X_{(0,Lv)} \quad (9)$$

$$= \frac{D(K*Lv+P) - G(H*Lv+M)}{(G+K*Lv+P)*G(K*Lv+P)} \quad (9.1)$$

$$dY_{h3} = Y_{(1,Lv)} - Y_{(0,Lv)} \quad (10)$$

$$= \frac{E(K*Lv+P) - G(J*Lv+N)}{(G+K*Lv+P)*(K*Lv+P)} \quad (10.1)$$

-continued $$dX_{v1} = X_{(0,1)} - X_{(0,0)} \quad (11)$$

$$= \frac{HP - KM}{P(K+P)} \quad (11.1)$$

$$dY_{v1} = Y_{(0,1)} - Y_{(0,0)} \quad (12)$$

$$= \frac{JP - KN}{P(K+P)} \quad (12.1)$$

$$dX_{v2} = X_{(Lh,1)} - X_{(Lh,0)} \quad (13)$$

$$= \frac{H(G*Lh+P) - K(D*Lh+M)}{(G*Lh+P)*(G*Lh+K+P)} \quad (13.1)$$

$$dY_{v2} = Y_{(Lh+1,1)} - Y_{(Lh,0)} \quad (14)$$

$$= \frac{J(G*Lh+P) - K(E*Lh+N)}{(G*Lh+K+P)*(G*Lh+P)} \quad (14.1)$$

$$dX_{v3} = X_{(0,Lv+1)} - X_{(0,Lv)} \quad (15)$$

$$= \frac{HP - KM}{(K(Lv+1)+P)*(K*Lv+P)} \quad (15.1)$$

$$dY_{v3} = Y_{(0,Lv+1)} - Y_{(0,Lv)} \quad (16)$$

$$= \frac{JP - KN}{(K(Lv+1)+P)*(K*Lv+P)} \quad (16.1)$$

Because a 2-D to 3-D transform may also rotate an image, both $dX_h$ and $dY_h$ must be considered in producing a horizontal compression factor. That is, to prevent aliasing in either direction, both the horizontal and vertical target space displacements that result from a horizontal source space step must be taken into account in calculating the horizontal compression factor that must be applied to the source space image as it is mapped into the target space. This is because rotation causes a horizontal source space step to create vertical and horizontal target displacements.

By finding the horizontal compression factors at three of the four corners of the source image rectangle, a linear equation can be found that approximates the horizontal compression factor at each pixel location of the source image:

$$Cf_h = A_h * X_s + B_h * Y_s + C_h \quad (17)$$

where $$A_h = \frac{Cf_{h2} - Cf_{h1}}{N_{horiz.steps} - 1} \quad (17.a)$$

$$B_h = \frac{Cf_{h3} - Cf_{h1}}{N_{vert.steps} - 1} \quad (17.b)$$

and $$C_h = Cf_{h1} \quad (17.c)$$

In a system operating on a pixel-by-pixel basis, the number of horizontal steps, $N_{horiz.steps}$, will be the number of pixels, and the number of vertical steps, $N_{vert.steps}$, will be the number of lines. Other systems are envisioned in which multiple pixels and lines are considered to be a single step, with the constant values A, B and C varied accordingly.

Equation (17) relies on the following three equations (18), (19) and (20) for the horizontal compression factors at the three corners of the source image rectangle:

$$Cf_{h1} = \frac{MAX[(|dX_{h1}|),(|dY_{h1}|)]}{(dX_{h1})^2 + (dY_{h1})^2} \quad (18)$$

$$Cf_{h2} = \frac{MAX[(|dX_{h2}|),(|dY_{h2}|)]}{(dX_{h2})^2 + (dY_{h2})^2} \quad (19)$$

$$Cf_{h3} = \frac{\text{MAX}[(|dX_{h3}|), (|dY_{h3}|)]}{(dX_{h3})^2 + (dY_{h3})^2} \quad (20)$$

A comparable set of equations can be derived for a vertical compression factor:

$$Cf_v = A_v * X_s + B_v * Y_s + C_v \quad (21)$$

where $$A_v = \frac{Cf_{v2} - Cf_{v1}}{N_{horiz.steps} - 1} \quad (21.a)$$

$$B_v = \frac{Cf_{v3} - Cf_{v1}}{N_{vert.steps} - 1} \quad (21.b)$$

and $$C_v = Cf_{v1} \quad (21.c)$$

$$Cf_{v1} = \frac{\text{MAX}[(|dX_{v1}|), (|dY_{v1}|)]}{(dX_{v1})^2 + (dY_{v1})^2} \quad (22)$$

$$Cf_{v2} = \frac{\text{MAX}[(|dX_{v2}|), (|dY_{v2}|)]}{(dX_{v2})^2 + (dY_{v2})^2} \quad (23)$$

$$Cf_{v3} = \frac{\text{MAX}[(|dX_{v3}|), (|dY_{v3}|)]}{(dX_{v3})^2 + (dY_{v3})^2} \quad (24)$$

Because horizontal chrominance components are sampled at half the frequency of the luminance components, the chrominance channel requires different filtering than the luminance channel does. This difference in horizontal sample rate affects both horizontal and vertical compression factors because image rotation makes horizontal sampling affect vertical target image detail.

To avoid the need for additional dual accumulators and coefficients for them, a subset of the required compression factors can be calculated and the rest derived from those by multiplication by an appropriate factor. To utilize this approach, it is first noted that some of the change factors for chrominance filtering vary from the change factors for luminance filtering by a factor of two. In the following equations, dX and dY refer to the direction, horizontal and vertical, respectively, of changes in the target space that are the result of the changes in the source space that are indicated by the associated subscripts. The first character of the subscripts, h or v, indicates the direction of a unit change in the source space that produced that effect, with h representing horizontal and v representing vertical unit steps. The second, capitalized character in the subscripts indicates whether luminance, L, or chrominance, C, is being described:

$$dX_{hC} = dX_{hL} \quad (25)$$

$$dY_{hC} = 2dY_{hL} \quad (26)$$

$$dX_{vC} = \frac{dX_{vL}}{2} \quad (27)$$

$$dY_{vC} = dY_{vL} \quad (28)$$

Using these relationships, the chrominance compression factors can be calculated using luminance change factors:

$$Cf_{h1C} = \frac{\text{MAX}[(|dX_{h1C}|), (|dY_{h1C}|)]}{(dX_{h1C})^2 + (dY_{h1C})^2} \quad (29)$$

$$= \frac{\text{MAX}[(|dX_{h1L}|), (|dY_{h1L}|)]}{(dX_{h1L})^2 + 4(dY_{h1L})^2} \quad (29.1)$$

$$Cf_{v1C} = \frac{\text{MAX}[(|dX_{v1C}|), (|dY_{v1C}|)]}{(dX_{v1C})^2 + (dY_{v1C})^2} \quad (30)$$

$$= \frac{\text{MAX}[(|(dX_{v1L})/2|), (|dY_{v1L}|)]}{(dX_{v1L})^2/4 + (dY_{v1L})^2} \quad (30.1)$$

$$Cf_{h2C} = \frac{\text{MAX}[(|dX_{h2C}|), (|dY_{h2C}|)]}{(dX_{h2C})^2 + (dY_{h2C})^2} \quad (31)$$

$$= \frac{\text{MAX}[(|dX_{h2L}|), (|2dY_{h2L}|)]}{(dX_{h2L})^2 + 4(dY_{h2L})^2} \quad (31.1)$$

$$Cf_{v2C} = \frac{\text{MAX}[(|dX_{v2C}|), (|dY_{v2C}|)]}{(dX_{v2C})^2 + (dY_{v2C})^2} \quad (32)$$

$$= \frac{\text{MAX}[(|(dX_{v2L})/2|), (|dY_{v2L}|)]}{(dX_{v2L})^2/4 + (dY_{v2L})^2} \quad (32.1)$$

$$Cf_{h3C} = \frac{\text{MAX}[(|dX_{h3C}|), (|dY_{h3C}|)]}{(dX_{h3C})^2 + (dY_{h3C})^2} \quad (33)$$

$$= \frac{\text{MAX}[(|dX_{h3L}|), (|2dY_{h3L}|)]}{(dX_{h3L})^2 + 4(dY_{h3L})^2} \quad (33.1)$$

$$Cf_{v3C} = \frac{\text{MAX}[(|dX_{v3C}|), (|dY_{v3C}|)]}{(dX_{v3C})^2 + (dY_{v3C})^2} \quad (34)$$

$$= \frac{\text{MAX}[(|(dX_{v3L})/2|), (|dY_{v3L}|)]}{(dX_{v3L})^2/4 + (dY_{v3L})^2} \quad (34.1)$$

The coefficients $A_{hC}$, $B_{hC}$, $C_{hC}$, and $A_{vC}$, $B_{vC}$, $C_{vC}$ can be recalculated in terms of the luminance change factors.

The horizontal chrominance compression factor, $Cf_{hL}$, and horizontal luminance compression factor, $Cf_{hC}$, are related by a multiplicative constant:

$$Cf_{hL}/Cf_{hC} = \frac{\text{Max}[|(DP - MG)|, |(EP - NG)|] * [(DP - MG)^2 + 4(EP - NG)^2]}{\text{Max}[|(DP - MG)|, |2(EP - NG)|] * [(DP - MG)^2 + (EP - NG)^2]} \quad (35)$$

$$= \frac{\text{Max}[1, R] * [1 + 4R^2]}{\text{Max}[1, 2R] * [1 + R^2]} \quad (35.1)$$

where $$R = \frac{|EP - NG|}{|DP - MG|} \quad (35.2)$$

and ranges between 0 and ∞.

It can be demonstrated that the compression factor ratio, $Cf_{hL}/Cf_{hC}$, lies between 1 and 2 for any value of R (from 0 to ∞).

Similarly, the ratio of the vertical chrominance compression factor, $Cf_{vC}$, to the vertical luminance compression factor, $Cf_{vL}$, are also related by a multiplicative constant:

$$\frac{Cf_{vC}}{Cf_{vL}} = \frac{2*\text{Max}[|(HP - KM)|, |2(JP - KN)|] * [(HP - KM)^2 + (JP - KN)^2])}{\text{Max}[|(HP - KM)|, |(JP - KN)|] * [(HP - KM)^2 + 4(JP - KN)^2]} \quad (36)$$

$$= \frac{2*\text{Max}[1, 2S] * [1 + S^2]}{\text{Max}[1, S] * [1 + 4S^2]} \quad (36.1)$$

where $$S = \frac{|JP - KN|}{|HP - KM|} \quad (36.2)$$

and ranges between 0 and ∞.

Similarly, it can be demonstrated that the compression factor ratio, $Cf_{vC}/Cf_{vL}$, lies between 1 and 2 for any value of S (from 0 to ∞). The foregoing facts will be very useful in reducing circuit complexity, as will be further described below.

Referring again to FIG. 3, the microprocessor 10 supplies the horizontal chrominance compression factor calculation coefficients, $A_{hC}$, $B_{hC}$ and $C_{hC}$ and vertical luminance compression factor calculation coefficients, $A_{vL}$, $B_{vL}$ and $C_{vL}$ to the horizontal chrominance compression dual accumulator 30 and vertical luminance compression dual accumulator 40, respectively.

Figure 4:
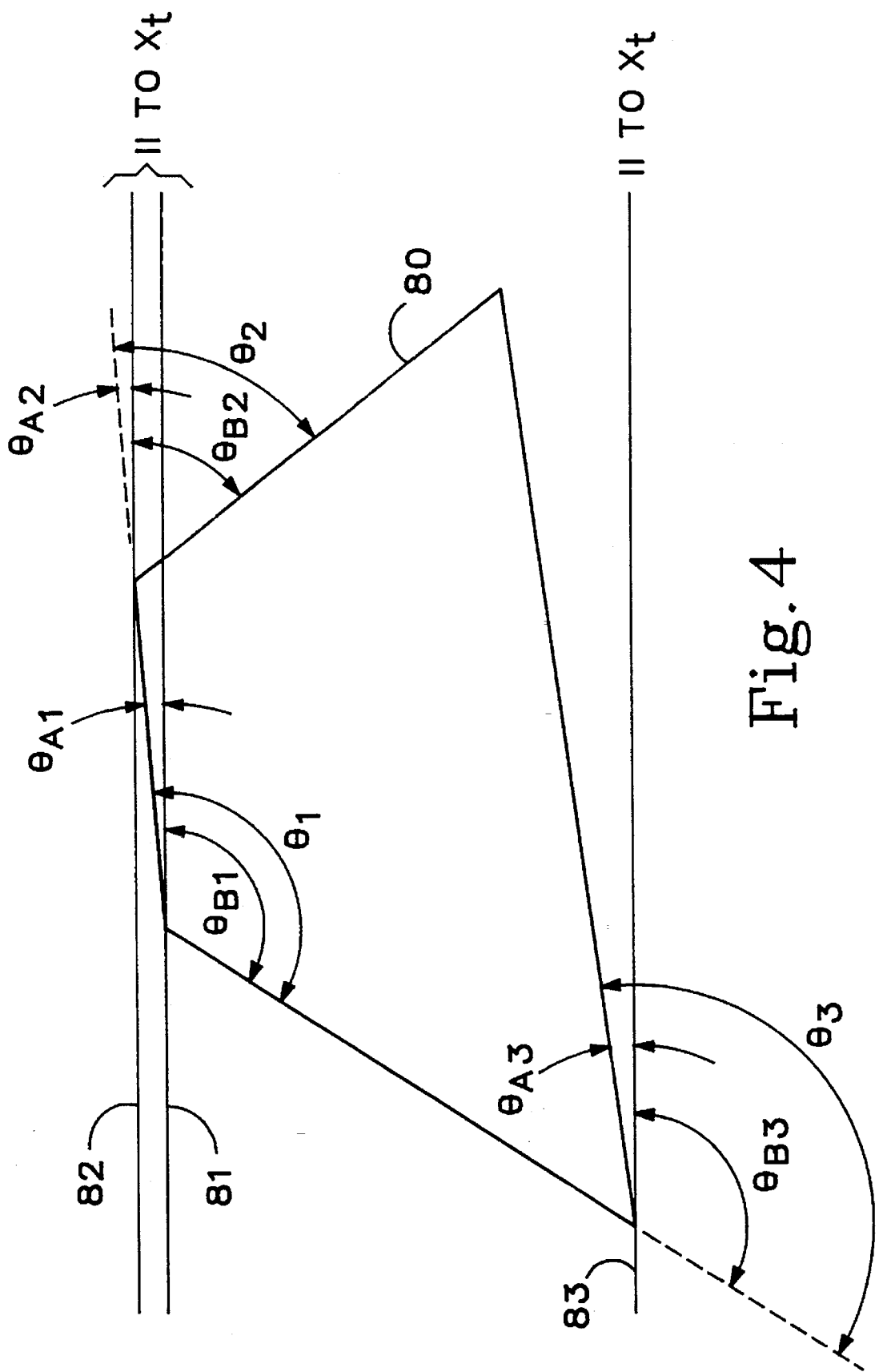
FIG. 4 is a diagram of the angles used in the skew angle coefficients generation process.

Referring to FIG. 4, a rectangular image 80 from the source space is shown mapped into the target space. Three lines 81, 82 and 83, that are parallel to the X-axis of the target space are shown intersecting three corners of the rectangular image 80. The derivation of the formulas for the third set of compression factor calculation coefficients, those used by skew angle dual accumulator 20, will now be described with reference to this Figure.

A linear equation in the source coordinates, $X_s$ and $Y_s$, that provides a step-by-step approximation of the local skew angle, $\Theta_s$, is:

$$\Theta_s = A_{sa}*X + B_{sa}*Y + C_{sa} \quad (37)$$

where $$A_{sa} = \frac{\Theta_2 - \Theta_1}{N_{horiz.steps} - 1} \quad (37.a)$$

$$B_{sa} = \frac{\Theta_3 - \Theta_1}{N_{vert.steps} - 1} \quad (37.b)$$

and $$C_{sa} = \Theta_1 \quad (37.c)$$

To obtain the values of $\Theta_1$, $\Theta_2$ and $\Theta_3$ needed for equations (37.a), (37.b) and (37.c), the other angles in FIG. 4 must be determined. As can be seen in FIG. 4 and equation (32), angle $\Theta_1$ is equal to angle $\Theta_{B1}$ minus angle $\Theta_{A1}$:

$$\Theta_1 \Theta_{B1} - \Theta_{A1} \quad (38)$$

Angle $\Theta_{A1}$ is the angle between the X-axis in the target space and the line defined in the target space by mapping the source origin and a unit horizontal step (to 1,0 in the source space) mapped to the target space. All angles are measured as positive in the clockwise direction from the target space horizontal axis and as negative in the counter-clockwise direction from that same axis. Angle $\Theta_{A1}$ is determined according to equation (39):

$$\Theta_{A1} = \arctan\left[\frac{dY_{h1}}{dX_{h1}}\right] \quad (39)$$

The arctan function used in equation (39), as well as elsewhere in this document, is the 4 quadrant arctangent, where the individual signs of the numerator and denominator have significance in identifying the quadrant; it is equivalent to the FORTRAN function ATAN2.

Angle $\Theta_{B1}$ is the angle between the X-axis in the target space and the line defined in the target space by mapping the source origin and a unit vertical step (to 0,1 in the source space) to the target space. Angle $\Theta_{B1}$ is determined according to equation (40):

$$\Theta_{B1} = \arctan\left[\frac{dY_{v1}}{dX_{v1}}\right] \quad (40)$$

As can be seen in FIG. 4 and equation (41), angle $\Theta_2$ is equal to angle $\Theta_{B2}$ minus angle $\Theta_{A2}$:

$$\Theta_2 = \Theta_{B2} - \Theta_{A2} \quad (41)$$

Angle $\Theta_{A2}$ is the angle between the X-axis in the target space and the line defined in the target space by mapping the last pixel on the first line in the source space and a unit horizontal step from that pixel (to L+1,0 in the source space) mapped to the target space. According to a basic geometric principle, i.e., that a straight line intersects parallel lines at the same angle, angle $\Theta_{A2}$ must be equal to angle $\Theta_{A1}$:

$$\Theta_{A2} = \Theta_{A1} \quad (42)$$

Angle $\Theta_{B2}$ is the angle between the X-axis in the target space and the line defined in the target space by mapping the last pixel on the first line in the source space and a unit vertical step from that pixel (to L,1 in the source space) mapped to the target space. Angle $\Theta_{B2}$ is determined according to equation (43):

$$\Theta_{B2} = \arctan\left[\frac{dY_{v2}}{dX_{v2}}\right] \quad (43)$$

As can be seen in FIG. 4 and equation (44), angle $\Theta_3$ is equal to angle $\Theta_{B3}$ minus angle $\Theta_{A3}$:

$$\Theta_3 = \Theta_{B3} - \Theta_{A3} \quad (44)$$

Angle $\Theta_{A3}$ is the angle between the X-axis in the target space and the line defined in the target space by mapping the first pixel on the last line in the source space and a unit horizontal step from that pixel (to 1,L in the source space) mapped to the target space. Angle $\Theta_{A3}$ is determined according to equation (45):

$$\Theta_{A3} = \arctan\left[\frac{dY_{h3}}{dX_{h3}}\right] \quad (45)$$

And, for the geometric reason given above in connection with equation (42):

$$\Theta_{B3}\Theta_{B1} \quad (46)$$

Referring again to FIG. 3, the microprocessor 10 calculates the $A_{sa}$, $B_{sa}$ and $C_{sa}$ coefficients of equations (37.a), (37.b) and (37.c) every field and supplies them to skew angle dual accumulator 20. In accordance with the timing signals from the timing generator 50, the skew angle dual accumulator 20 produces a 32 bit output according to equation (38).

Figure 5:
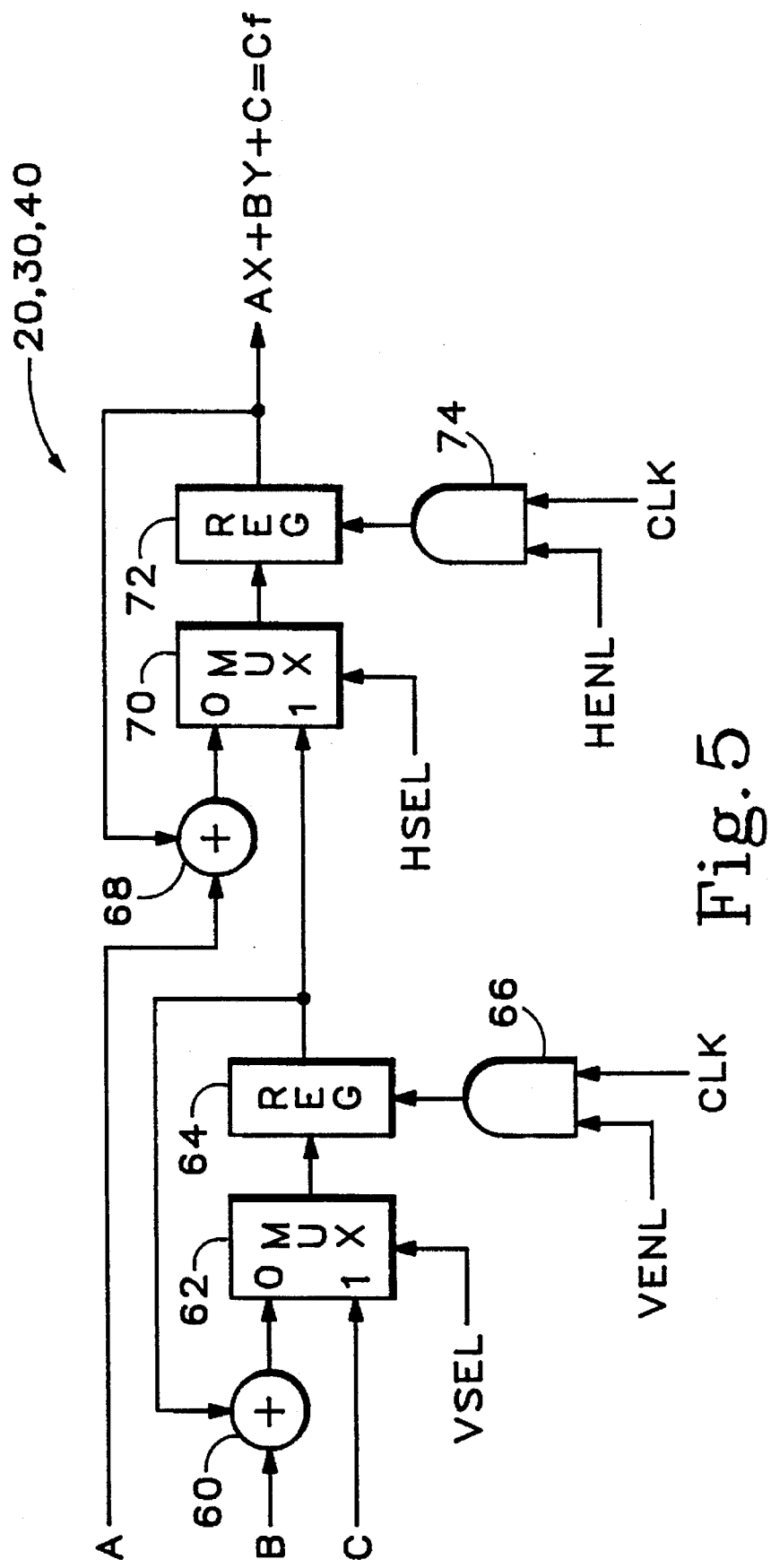
FIG. 5 is a block diagram of a dual accumulator suitable for implementing the equation Cf=AX+BY+C according to the present invention.

Referring now to FIG. 5, all three of the dual accumulators 20, 30 and 40 are identical. The dual accumulators contain a first adder 60 that sums the B coefficient input and the contents of a first register 64. A first multiplexer 62 selects between the C coefficient on its "1" input and the output of the first adder 60 on its "0" input. The output of the first multiplexer 62 is the input to the first register 64.

A second multiplexer 70 selects between the contents of the first register 64 on its "1" input and the output of a second adder 68 on its "0" input. The output of the second multiplexer 70 is the input to a second register 72. The second adder 68 sums the A coefficient input and the contents of the second register 72. The output of the second register is the desired linear equation, which can be a compression factor or a skew angle.

At the beginning of a new field, VSEL (vertical select) is a "1" and the first multiplexer 62 supplies the C coefficient to the input of the first register 64. VENL (vertical enable) goes high for one clock cycle, enabling AND gate 66 so that a CLK (pixel rate clock) is allowed to pass and the first register 64 is clocked once, after which it holds the value of C. VSEL then goes low for the duration of the field and the first multiplexer 62 presents the output of the first adder 60 to the input of the first register 64. Once each vertical step (ideally one line) VENL allows another CLK to reach the first register 64, so that the first register 64 keeps increasing by another B each vertical step to implement $BY_s+C$.

HSEL (horizontal select) controls the second multiplexer 70. At the beginning of each line HSEL goes high for one clock cycle, causing the second multiplexer 70 to present the output of the first register 64 to the input of the second register 72. Thus, prior to the beginning of each line the second register is initialized to the current value of $BY_s+C$. During the rest of each line HSEL is low and the output of the second adder 68 is connected by multiplexer 70 to the input of the second register 72. HENL (horizontal enable) is high during all active video time. Each CLK therefore causes the second register 72 to increment by another A value via the operation of the second adder 68, so that the output of the second register 72 is the desired equation, $AX_s+BY_s+C$.

The dual accumulators 20, 30 and 40 could alternatively be implemented as single accumulators. In this implementation, a microprocessor 10 replaces the first (vertical) accumulator 60,62,64,66 by supplying a new $B*Y_s+C$ to the horizontal accumulator 68,70,72,74 just prior to the beginning of each vertical step.

The output of the horizontal chrominance compression dual accumulator 30 is a 32 bit integer representing the horizontal chrominance compression factor for chrominance, $Cf_{hC}$. That integer is converted to a floating point number by int-to-float converter 32. The resulting floating point number has five bits of exponent and seven bits of mantissa. The floating point version of the horizontal chrominance compression factor for chrominance is then converted to an integer logarithm by float-to-log,int converter 34, which produces an output having four bits of integer and six bits of fraction. The output of the float-to-log, int converter 34 is applied to one input of summation circuit 36. The sign bits of the integer outputs of the horizontal chrominance compression dual accumulator 30 and the vertical luminance compression dual accumulator 40 are used by the limiters 28, 38, 48 and 58 to limit their outputs to zero when the sign bits indicate the presence of a negative number.

While a base-two logarithm implementation is shown, it could have another base. Base-two logarithms are particularly convenient, however, since the floating point exponent becomes the integer part of the logarithm without further conversion.

The output of the vertical luminance compression dual accumulator 40 is also a 40 bit integer. It represents the vertical compression factor for luminance, $Cf_{vL}$. That integer is converted to a floating point number by int-to-float converter 42. The resulting floating point number has five bits of exponent and seven bits of mantissa. The floating point version of the vertical luminance compression factor is then converted to an integer logarithm by float-to-log, int converter 44, which produces an output having a sign bit, four bits of integer and six bits of fraction. The output of the float-to-log, int converter 44 is applied to one input of summation circuit 46.

Referring again to FIG. 3, absolute value circuit 22 receives the output of the skew angle dual accumulator 20 and produces the absolute value of the most significant 11 bits as its output (the sign bit and 20 least significant bits being discarded). This value represents an angle between 0 and 180 degrees. The output of the absolute value circuit 22 is applied to a lookup table 24, typically a PROM, that implements the $\log_2$ of a skew angle determining function whose value approaches infinity for angles near 0° and 180°, and whose value approaches one for angles near 90°. Three such functions are shown in equations (47), (48), and (49a) (49b), the latter two of which operate as a pair over the indicated ranges of angles:

$$Output=\log_x[1/\sin(|\Theta_s|)] \quad (47)$$

$$Output=\log_x[1/\sqrt{(1-\cos(|\Theta_s|))}] \quad (48)$$

$$Output=\log_x[1/(|\Theta_s|/90|)]\{0<|\Theta|\leq 90\} \quad (49a)$$

$$Output=\log_x[1/(|180-\Theta_s|/90|)]\{90<|\Theta|<180\} \quad (49b)$$

The essential characteristic of the inner portion of these functions, the portion that is inverted and its logarithm taken, is that it have a value of one at 90° and a value of zero at 0° and 180°. The lookup table 24 is shown as implementing equation (48), with x=2.

The output of lookup table 24 has two bits of integer part and six bits of fractional part, so that it has a maximum value of 3 and 63/64. If the value of the input to the lookup table 24 would produce a compression that exceeds 3 and 63/64, the lookup table 24 produces 3 and 63/64 instead. The output of the lookup table 24 is applied to one input of summation circuit 36 and one input of summation circuit 46.

The output of summation circuit 36 is four bits of integer, five bits of fraction and sign and overflow bits, and represents the base two logarithm of the combined compression factors for skew angle and horizontal chrominance compression. The output of summation circuit 36 is applied to the input of limiter 38.

The output of summation circuit 46 is also four bits of integer, five bits of fraction and sign and overflow bits, and represents the base two logarithm of the combined compression factors for skew angle and vertical luminance compression. The output of summation circuit 46 is applied to the input of limiter 48.

The output of summation circuit 36 is applied to one input of summation circuit 26, the other input of which is supplied with an offset. For example, if the horizontal chrominance compression factor, $Cf_{hC}$, is known, it can be multiplied by the ratio of horizontal luminance compression factor, $Cf_{hL}$, to the horizontal chrominance compression factor, $Cf_{hC}$, as described above in connection with equation (35), to produce the horizontal luminance compression factor:

$$Cf_{hC} \times \frac{Cf_{hL}}{Cf_{hC}} = Cf_{hL} \quad (50)$$

Because addition of logarithms is equivalent to the multiplication of their anti-logs, the offset that is added by summation circuit 26 is the (base two) logarithm of the ratio of the horizontal luminance compression factor, $Cf_{hL}$, to the horizontal chrominance compression factor, $Cf_{hC}$, [equation (35)].

$$Offset_{hL} = \log_2\left[\frac{Cf_{hL}}{Cf_{hC}}\right] \quad (51)$$

Because the transform matrix function does not change within a given field, the ratio of the chrominance compression factor to the luminance compression factor is a constant within that field, and so is the logarithm of the ratio of those compression factors. Therefore, the logarithm of this number is a constant, a constant that varies between zero and one for base-two logarithms, as shown above, which can be calculated by the microprocessor 10 between fields and downloaded to the hardware.

The result of adding this offset is to produce the logarithm of the horizontal luminance compression factor, $Cf_{hL}$, from the logarithm of the horizontal chrominance compression factor, $Cf_{hC}$, with an adder rather than another dual accumulator; and, because the horizontal luminance compression factor is always greater than or equal to the horizontal chrominance compression factor, as shown earlier, the logarithm of this ratio is always positive and summation circuit 26 can be a simple adder.

The output of summation circuit 46 is applied to one input of summation circuit 56, the other input of which is supplied with an offset that is the (base two) logarithm of the ratio of the vertical chrominance compression factor, $Cf_{vC}$, to the vertical luminance compression factor, $Cf_{vL}$, as described above in connection with equation (36), to produce the vertical chrominance compression factor:

$$\text{Offset}_{vC} = \log_2 \left[ \frac{Cf_{vC}}{Cf_{vL}} \right] \tag{52}$$

As with the other offset, this ratio is a constant that can be calculated by the microprocessor 10 between fields and downloaded to the hardware. And again, this permits the production of the logarithm of the vertical chrominance compression factor, $Cf_{vC}$, from the vertical luminance compression factor, $Cf_{vL}$, with an adder rather than another dual accumulator. And, because the vertical chrominance compression factor is always greater than or equal to the vertical luminance compression factor, the logarithm of this ratio is also always positive and summation circuit 56 can also be a simple adder.

The limiters 28, 38, 48 and 58, all produce two bits of integer and five bits of fraction, for a maximum value of 3 and $^{31}/_{32}$. They also monitor the overflow bit on their inputs, and, if it is set, they respond to it by forcing their output bits to all "1"s. If the sign bits received from the dual accumulators 30 or 32 indicate that an input is negative, the limiters 28 and 38, or 48 and 58, force their outputs to all "0"s. The limiters 28, 38, 48 and 58 thus limit their outputs to the range of 0 to 3 and $^{31}/_{32}$, inclusive.

The seven bits of the outputs of the limiters 28, 38, 48 and 58 select among 128 filter coefficients that are available in each of the variable filters 200, 250, 300 and 350 (shown in FIG. 2) to produce filtering that is appropriate to compression factors ranging from 1:1 to $2^{(3+31/32)}$:1 (approximately 15.657:1). Inputs to the limiters 28, 38, 48 and 58 that are negative represent expansion of the image rather than compression, and these are appropriately treated as no compression. Inputs to the limiters 28, 38, 48 and 58 that are greater than 3 and $^{31}/_{32}$, i.e., an overflow condition, are only filtered the maximum amount, corresponding to the compression factor of approximately 15.657:1, even if more filtering would be desirable.

While this implementation shown uses one skew angle dual accumulator 20 and one each horizontal and vertical dual accumulators 30 and 40, other alternatives are possible. Because the vertical filter operates over a number of lines, there is a delay of several lines (four, for example) between the center tap of the horizontal filter and the center tap of the vertical filter. For ideal filtering, two skew compression calculators could be employed, one for the horizontal filter and another for the vertical one, with the vertical one generating the same factor for data delayed by the number of lines between the center taps of the two filters; however, because the number of lines of delay involved is so small compared to the whole field, adequate results are obtained by using only one skew compression calculator for both filters, with that one skew compression calculator calculating for a line in between the two center taps.

Similar reasoning could also be employed to further reduce the number of dual accumulators to two. Horizontal and vertical filters could also share one dual accumulator, if the assumption were made that changes in depth across a few lines were largely insignificant, so that an "average" depth-based compression factor could be used for both filters. The depth factor calculator would then calculate the logarithm of the smallest of the depth factors and each of the other factors could be derived by adding an offset based on ratios between the desired factor and the one actually calculated. These ratios would all be constant for any one field, and yet could be recalculated on a field-by-field basis.

In an actual implementation there may be registers between various processing elements of this apparatus in order to break operations into steps that can be performed in individual clock periods. This method is frequently referred to as pipelining. If pipelining is employed, the horizontal accumulator may have to be started a few clock periods before the beginning of the line, in order to account for the register delays from the accumulator output until the selected filter coefficients multiply with the first horizontal pixel at the horizontal filter's center tap. In fact, the horizontal accumulator may start several clock periods (horizontal steps) earlier than what is required to account for register delays; for every horizontal step "early" that the accumulator loads, the value that it is loaded with is decremented by A. For example, if the horizontal accumulator is loaded five horizontal steps early, the value of C is decremented by 5*A.

Similarly, the vertical accumulator may be loaded as early as desired, as long as the constant C is decremented by B multiplied by the number of lines between the accumulator loading and the first line of the field entering the center tap of the vertical filter.

While the embodiment of the invention described utilizes logarithmic control of the variable filtering means 200,250, 300,350, and therefore uses summation circuits 26,36,46,56 to combine logarithmic compression factors and offsets, these combinations could be effectuated by other means. For example, generic combining means 27,37,47,57 could be implemented as multiplication circuits. Although multiplication circuits are more complicated and expensive than summation circuits, their use would eliminate the need for float-to-log,int converters 34 and 44. This alternative would also require changing the functionality of circuit 24 to eliminate the log function, and would require the variable filters 200,250,300,350 to be controllable by linear numerical means. A mixture of linear and logarithmic processing could be employed at separate stages.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true scope of the invention.

We claim:

1. An anti-aliasing filtering system for video effects equipment that performs 3-D manipulation of 2-D images, the system comprising:

means for calculating constants A, B and C on a predetermined interval basis according to the content of a transform matrix function F for manipulating a video signal input representing the 2-D images;

means for implementing on a local basis within a region of the predetermined interval a linear equation, $Cf=AX_s+BY_s+C$, to produce a compression factor Cf where $X_s$ is a horizontal step address and $Y_s$ is a vertical step address;

a dynamically controllable filter capable of filtering the video signal input to a selected cutoff frequency, the selected cutoff frequency being determined according to the compression factor Cf, the filter producing a filtered video output for manipulation by the video effects equipment according to the transform matrix function.

15

2. An anti-aliasing filtering system according to claim 1 wherein the means for implementing comprises a dual accumulator having a first stage, initialized with C at the beginning of each predetermined interval and accumulating by B each vertical step to form $B*Y_s+C$, and a second stage, initialized with $B*Y_s+C$ at the beginning of each vertical step and accumulating by A each horizontal step to form $A*X_s+B*Y_s+C$, so that Cf is available at an output of the second stage.

3. An anti-aliasing filtering system according to claim 1 wherein the means for implementing comprises a single accumulator that is supplied with $B*Y_s+C$ by the means for calculating at the beginning of each vertical step, the single accumulator accumulating by A each horizontal step to form $A*X_s+B*Y_s+C$, so that Cf is available at an output of the single accumulator.

4. An anti-aliasing filtering system according to claim 1 wherein the horizontal step is a pixel and the vertical step is a line of the video signal input.

5. An anti-aliasing filtering system according to claim 1 further comprising:

means for determining a ratio of a second compression factor $Cf_2$ to the compression factor Cf on the predetermined interval basis according to the content of the transform matrix function F; and means for multiplying Cf by the ratio to obtain $Cf_2$.

6. An anti-aliasing filtering system according to claim 1 wherein the dynamically controllable filter accepts logarithmic compression factor inputs and the anti-aliasing filtering system further comprises means for converting the compression factor Cf to a logarithm of the compression factor log:Cf for input to the dynamically controllable filter to determine the selected cutoff frequency.

7. An anti-aliasing filtering system according to claim 6 further comprising:

means for determining a logarithm, log:ratio, of a ratio of a second compression factor $Cf_2$ to the compression factor Cf on the predetermined interval basis according to the content of the transform matrix function F; and means for adding log:ratio to log:Cf to obtain $log:Cf_2$.

8. An anti-aliasing filtering system according to claim 6 further comprising:

means for calculating skew angle constants $A_{sa}$, $B_{sa}$ and $C_{sa}$ on the predetermined interval basis according to the content of the transform matrix function F;

means for producing a skew angle log compression factor, $log:Cf_{sa}$, based on the skew angle constants; and means for adding the skew angle log compression factor $log:Cf_{sa}$ to the log compression factor log:Cf to produce a combined log compression factor, log:Cfc, the combined log compression factor Cfc being used as the log compression factor Cf by the dynamically controllable filter.

9. An anti-aliasing filtering system according to claim 8 further comprising:

means for determining a logarithm, log:ratio, of a ratio of a second compression factor $Cf_2$ to the compression factor Cf on the predetermined interval basis according to the content of the transform matrix function F; and means for adding log:ratio to log:Cf to obtain $log:Cf_2$.

10. An anti-aliasing filtering system according to claim 8 wherein the means for producing comprises:

means for implementing on a pixel-by-pixel basis a linear equation, $Cf=A_{sa}*X_s+B_{sa}*Y_s+C_{sa}$, to produce a skew angle $\Theta$, where $X_s$ is a pixel address and $Y_s$ is a line address;

16 means for finding the absolute value of $\Theta$, $|\Theta|$; and means for ascertaining a logarithmic value of the inverse of a skew angle determining function to produce the skew angle log compression factor, $log:Cf_{sa}$, the determining function having the property of being one at 90° and zero at 0° and 180°.

11. An anti-aliasing filtering system according to claim 10 wherein the skew angle determining function is the square root of the quantity $[1-\cos(|\Theta|)]$.

12. An anti-aliasing filtering system according to claim 10 wherein the skew angle determining function is the sine of the absolute value of the skew angle.

13. An anti-aliasing filtering system according to claim 10 wherein the skew angle determining function is $|\Theta_s/90|$ for $\Theta_s$ between 0° and 90° and $(180-|\Theta_s|)/90$ for $\Theta_s$ between 90° and 180°.

14. An anti-aliasing filtering system according to claim 1 further comprising:

means for calculating skew angle constants $A_{sa}$, $B_{sa}$ and $C_{sa}$ on the predetermined interval basis according to the content of the transform matrix function F;

means for producing a skew angle compression factor, $Cf_{sa}$, based on the skew angle constants; and means for combining the skew angle compression factor $Cf_{sa}$ with the compression factor Cf to produce a combined compression factor, Cfc, the combined compression factor Cfc being used as the compression factor Cf by the dynamically controllable filter.

15. An anti-aliasing filtering system according to claim 14 further comprising:

means for determining a ratio of a second compression factor $Cf_2$ to the compression factor Cf on the predetermined interval basis according to the content of the transform matrix function F; and means for multiplying Cf by the ratio to obtain $Cf_2$.

16. An anti-aliasing filtering system according to claim 14 wherein the means for producing comprises:

means for implementing on a step-by-step basis a linear equation, $Cf+A_{sa}*X_s+B_{sa}*Y_s+C_{sa}$, to produce a skew angle $\Theta$, where $X_s$ is a horizontal step address and $Y_s$ is a vertical step address;

means for finding the absolute value of $\Theta$, $|\Theta|$; and means for ascertaining the value of the inverse of a skew angle determining function to produce the skew angle compression factor, $Cf_{sa}$, the determining function having the property of being one at 90° and zero at 0° and 180°.

17. An anti-aliasing filtering system according to claim 16 wherein the skew angle determining function is the square root of the quantity $[1-\cos(|\Theta|)]$.

18. An anti-aliasing filtering system according to claim 16 wherein the skew angle determining function is the sine of the absolute value of the skew angle.

19. An anti-aliasing filtering system according to claim 16 wherein the skew angle determining function is $|\Theta_s/90|$ for $\Theta_s$ between 0° and 90° and $(180-|\Theta_s|)/90$ for $\Theta_s$ between 90° and 180°.

20. A method for anti-aliasing filtering a two dimensional video signal that is being manipulated in three dimensions by video effects equipment, the method comprising the steps of:

pre-calculating on a predetermined interval basis coefficients for a linear equation $Cf=AX_s+BY_s+C_{[s]}$, where Cf is a resulting compression factor, $X_s$ is a horizontal step location on each of a plurality of vertical steps and $Y_s$ is the vertical step location in each predetermined interval, the coefficients being based on the content of a transform matrix function F;

calculating on a local basis within the predetermined interval the compression factor Cf using the linear equation; and selecting a filtering function on a local basis within a region of the predetermined interval based on the compression factor Cf, the filtering function being capable of filtering the two dimensional video signal to a selected cutoff frequency according to the compression factor to produce a filtered video signal to be manipulated by the digital effects equipment according to the transform matrix function.

21. A method according to claim 20 wherein the calculating step comprises the steps of:

storing at the beginning of each predetermined interval a value C to produce a stored value of $BY_s+C$ where $Y_s$ initially equals 0;

adding B to the stored value of $BY_s+C$ upon the occurrence of each vertical step $Y_s$ to implement $BY_s+C$;

transferring the value of $BY_s+C$ to a second storage location upon the occurrence of each vertical step $Y_s$ to produce a stored value of $AX_s+BY_s+C$ where $X_s$ initially equals 0; and adding A to the second stored value of $AX_s+BY_s+C$ upon the occurrence of each horizontal step $X_s$ to produce the output $Cf=AX_s+BY_s+C$.

22. A method according to claim 20 wherein the calculating step comprises the step of:

pre-calculating for each vertical step a value of $BY_s+C$;

storing the pre-calculated value of $BY_s+C$; and adding A to the stored value of $BY_s+C$ upon the occurrence of each horizontal step $X_s$ to produce the output $Cf=AX_s+BY_s+C$.

23. A method according to claim 20 wherein the horizontal step is a pixel and the vertical step is a line of the two dimensional video signal.

24. A method according to claim 20 further comprising the steps of:

determining a ratio of a second compression factor $Cf_2$ to the compression factor Cf on the predetermined interval basis according to the content of the transform matrix function F; and multiplying Cf by the ratio to obtain $Cf_2$.

25. A method according to claim 20 wherein the selecting step selects the filtering function based on a logarithm, log:Cf, of the compression factor Cf and the method further comprises the step of:

converting the compression factor Cf to the logarithm, log:Cf.

26. A method according to claim 25 further comprising the steps of:

determining a logarithm, log:ratio, of a ratio of a second compression factor $Cf_2$ to the compression factor Cf on the predetermined interval basis according to the content of the transform matrix function F; and adding log:ratio to log:Cf to obtain log:$Cf_2$.

27. A method according to claim 25 further comprising the steps of:

calculating skew angle constants $A_{sa}$, $B_{sa}$ and $C_{sa}$ on the predetermined interval basis according to the content of the transform matrix function F;

producing a skew angle log compression factor, log:$Cf_{sa}$, based on the skew angle constants; and adding the skew angle log compression factor log:$Cf_{sa}$ to the log compression factor log:Cf to produce a combined log compression factor, log:Cfc, the combined log compression factor log:Cfc being used as the log compression factor Cf in the selecting step.

28. A method according to claim 27 further comprising the steps of:

determining a logarithm, log:ratio, of a ratio of a second compression factor $Cf_2$ to the compression factor Cf on the predetermined interval basis according to the content of the transform matrix function F; and adding log:ratio to log:Cf to obtain log:$Cf_2$.

29. A method according to claim 27 wherein the producing step comprises the steps of:

implementing on a pixel-by-pixel basis a linear equation, $Cf=A_{sa}{}^*X_s+B_{sa}{}^*Y_s+C_{sa}$, to produce a skew angle $\Theta$, where $X_s$ is a pixel address and $Y_s$ is a line address;

finding the absolute value of $\Theta$, $|\Theta|$; and ascertaining a logarithmic value of the inverse of a skew angle determining function to produce the skew angle log compression factor, log:$Cf_{sa}$, the determining function having the property of being one at 90° and zero at 0° and 180°.

30. A method according to claim 29 wherein the skew angle determining function is the square root of the quantity $[1-\cos(|\Theta|)]$.

31. A method according to claim 29 wherein the skew angle determining function is the sine of the absolute value of the skew angle.

32. A method according to claim 29 wherein the skew angle determining function is $|\Theta_s/90|$ for $\Theta_s$ between 0° and 90° and $(180-|\Theta_s|)/90$ for $\Theta_s$ between 90° and 180°.

33. A method according to claim 20 further comprising the steps of:

calculating skew angle constants $A_{sa}$, $B_{sa}$ and $C_{sa}$ on the predetermined interval basis according to the content of the transform matrix function F;

producing a skew angle compression factor, $Cf_{sa}$, based on the skew angle constants; and combining the skew angle compression factor $Cf_{sa}$ with the compression factor Cf to produce a combined compression factor, Cfc, the combined compression factor Cfc being used as the compression factor Cf in the selecting step.

34. A method according to claim 33 further comprising the steps of:

determining a ratio of a second compression factor $Cf_2$ to the compression factor Cf on the predetermined interval basis according to the content of the transform matrix function F; and multiplying Cf by the ratio to obtain $Cf_2$.

35. A method according to claim 33 wherein the producing step comprises the steps of:

implementing on a pixel-by-pixel basis a linear equation, $Cf=A_{sa}{}^*X_s+B_{sa}{}^*Y_s+C_{sa}$, to produce a skew angle $\Theta$, where $X_s$ is a pixel address and $Y_s$ is a line address;

finding the absolute value of $\Theta$, $|\Theta|$; and ascertaining the value of the inverse of a skew angle determining function to produce the skew angle compression factor, $Cf_{sa}$, the determining function having the property of being one at 90° and zero at 0° and 180°.

36. A method according to claim 35 wherein the skew angle determining function is the square root of the quantity $[1-\cos(|\Theta|)]$.

37. A method according to claim 35 wherein the skew angle determining function is the sine of the absolute value of the skew angle.

38. A method according to claim 35 wherein the skew angle determining function is $|\Theta_s/90|$ for $\Theta_s$ between 0° and 90° and $(180-|\Theta_s|)/90$ for $\Theta_s$ between 90° and 180°.

39. A video image manipulation apparatus comprising:

means for performing two-dimension to three-dimension to two-dimension manipulation of a planar video image signal according to a transform matrix function F derived from operator input;

a dynamically controllable filter capable of filtering a video signal input to a selected cutoff frequency, the selected cutoff frequency being determined on a local basis within a region of a predetermined interval according to a compression factor Cf, the filter producing a filtered video output as the planar video image signal;

means for calculating constants A, B and C on the predetermined interval basis according to the content of the transform matrix function F; and means for implementing on the local basis within the region of the predetermined interval a linear equation, $Cf=AX_s+BY_s+C$, to produce the compression factor Cf where $X_s$ is a horizontal step address and $Y_s$ is a vertical step address.

* * * * *